United States Patent
Ishizaki et al.

(10) Patent No.: US 9,791,951 B2
(45) Date of Patent: Oct. 17, 2017

(54) DISPLAY DEVICE AND METHOD OF MANUFACTURING SAME

(71) Applicant: c/o Japan Display West Inc., Aichi (JP)

(72) Inventors: Koji Ishizaki, Aichi (JP); Kouji Noguchi, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 32 days.

(21) Appl. No.: 14/575,092

(22) Filed: Dec. 18, 2014

(65) Prior Publication Data

US 2015/0103277 A1   Apr. 16, 2015

Related U.S. Application Data

(63) Continuation of application No. 12/706,808, filed on Feb. 17, 2010, now Pat. No. 9,459,718.

(30) Foreign Application Priority Data

Feb. 24, 2009 (JP) ................. 2009-040728

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13306* (2013.01); *G02F 1/13338* (2013.01);
(Continued)

(58) Field of Classification Search
CPC ........... G02F 1/13338; G02F 1/133514; G02F 1/13306; G02F 1/133528; G02F 1/134309; G06F 3/044; G06F 3/0412
See application file for complete search history.

(56) References Cited

U.S. PATENT DOCUMENTS

| 6,108,438 A | 8/2000 | Bird et al. |
| 2008/0062140 A1 | 3/2008 | Hotelling |

(Continued)

FOREIGN PATENT DOCUMENTS

| JP | 2008-009476 | 1/2008 |
| JP | 2008-009750 | 1/2008 |

(Continued)

OTHER PUBLICATIONS

USPTO Office Action issued in connection with related U.S. Appl. No. 13/918,271 dated Feb. 26, 2014.

(Continued)

*Primary Examiner* — Jessica M Merlin
(74) *Attorney, Agent, or Firm* — Dentons US LLP

(57) ABSTRACT

Disclosed herein is a display device including a substrate, a plurality of pixel electrodes arranged in a form of a matrix in a plane parallel with the substrate, a display functional layer exerting an image display function on a basis of an image signal supplied to the plurality of pixel electrodes, a driving electrode opposed to the plurality of pixel electrodes, and a plurality of detecting electrodes arranged in a form of a plane opposed to the driving electrode, separated and arranged at a pitch of a natural number multiple of an arrangement pitch of the pixel electrodes in one direction in the arrangement plane, and each capacitively coupled with the driving electrode.

6 Claims, 16 Drawing Sheets

(51) Int. Cl.
*G02F 1/1333* (2006.01)
*G02F 1/1343* (2006.01)
*G02F 1/133* (2006.01)
*G02F 1/1335* (2006.01)

(52) U.S. Cl.
CPC .. *G02F 1/133514* (2013.01); *G02F 1/133528* (2013.01); *G02F 1/134309* (2013.01); *G06F 3/044* (2013.01)

(56) References Cited

U.S. PATENT DOCUMENTS

| | | | |
|---|---|---|---|
| 2009/0085885 A1* | 4/2009 | Wu et al. | 345/173 |
| 2009/0096760 A1 | 4/2009 | Ma et al. | |
| 2009/0185088 A1* | 7/2009 | Shinohara | 349/12 |
| 2009/0185123 A1 | 7/2009 | Morimoto et al. | |
| 2009/0277695 A1* | 11/2009 | Liu | G06F 3/044 178/18.03 |

FOREIGN PATENT DOCUMENTS

| | | |
|---|---|---|
| JP | 2008-129708 | 6/2008 |
| JP | 2008-233315 | 10/2008 |

OTHER PUBLICATIONS

Taiwanese Office Examination report issued in connection with related Taiwanese Patent Application No. TW 99104192 dated May 30, 2013.

Japanese Office Examination Report issued in connection with related Japanese patent application No. JP 2009-040728 dated Dec. 21, 2010.

US Office Action issued in related U.S. Appl. No. 14/575,075 dated Jun. 30, 2015.

* cited by examiner

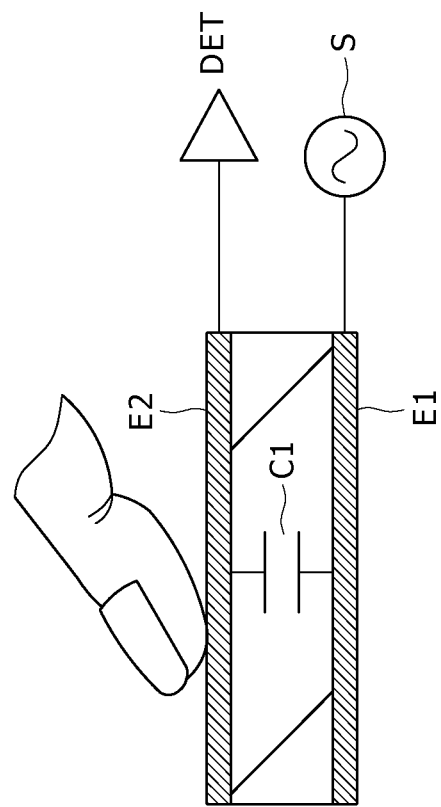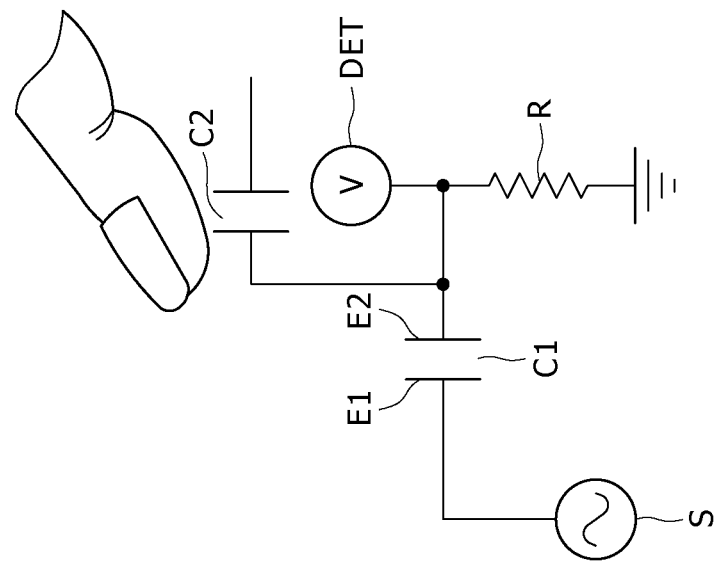

FIG.3A
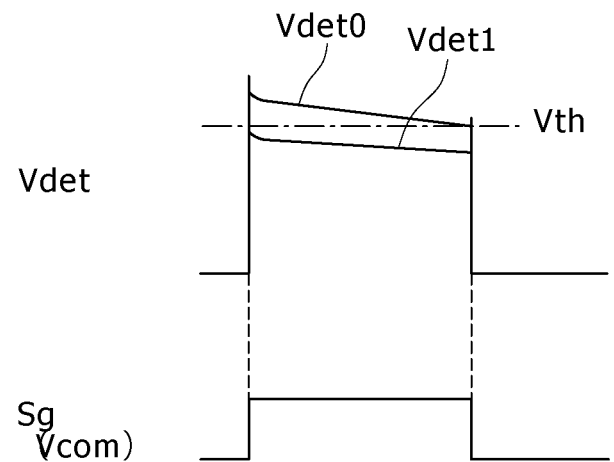
FIG.3B
FIG.3C
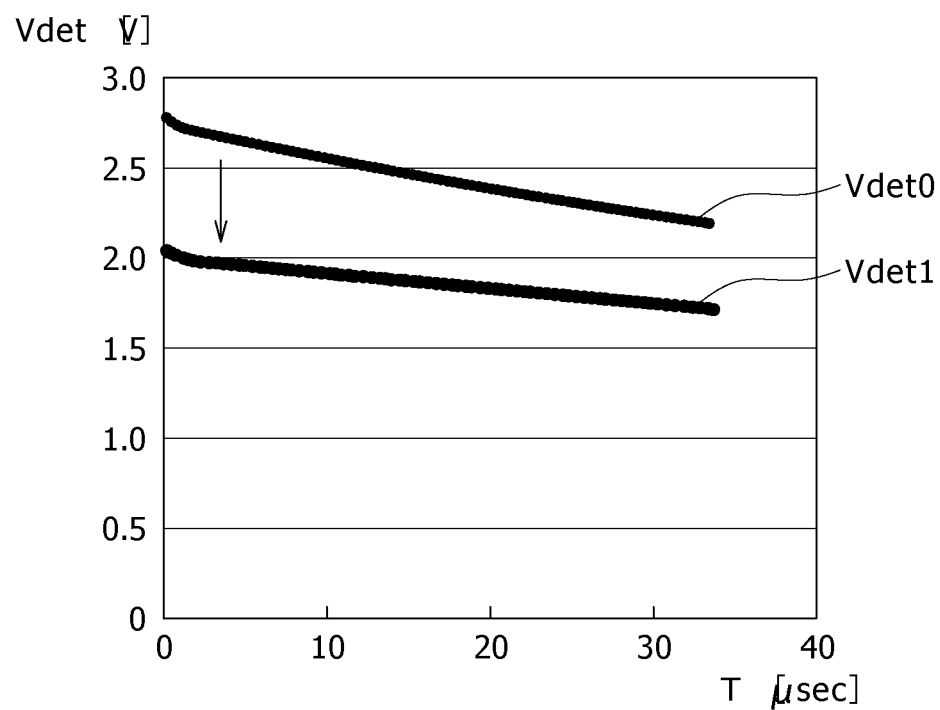

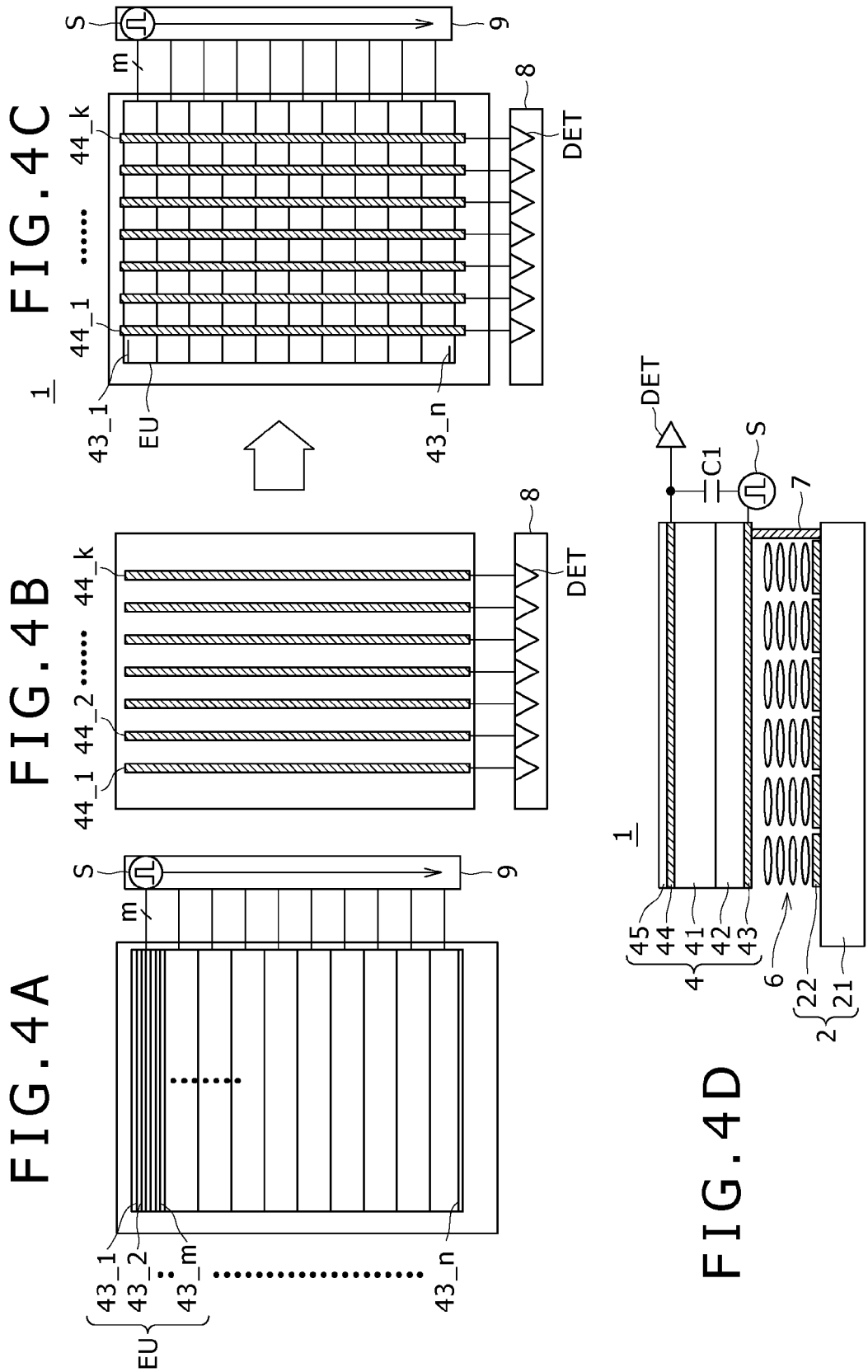

FIG.8A
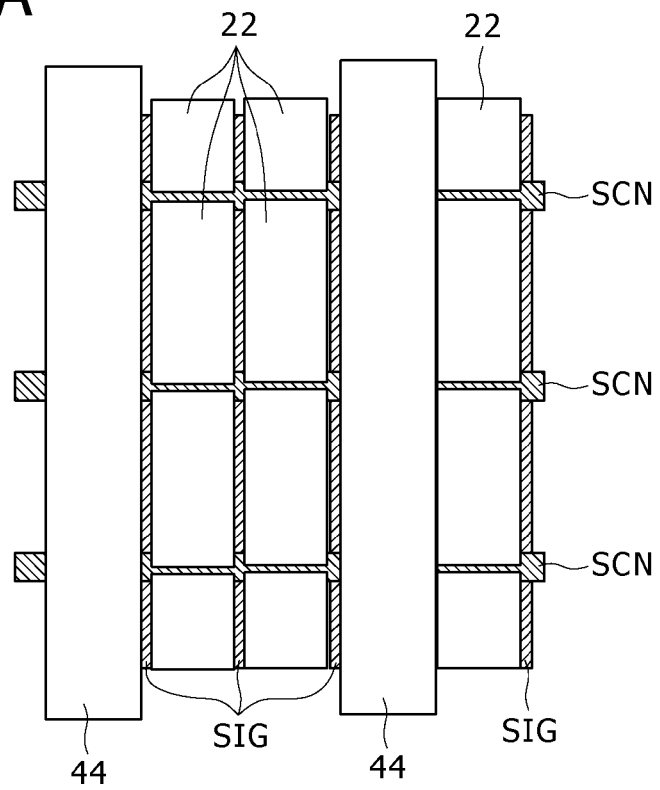
FIG.8B
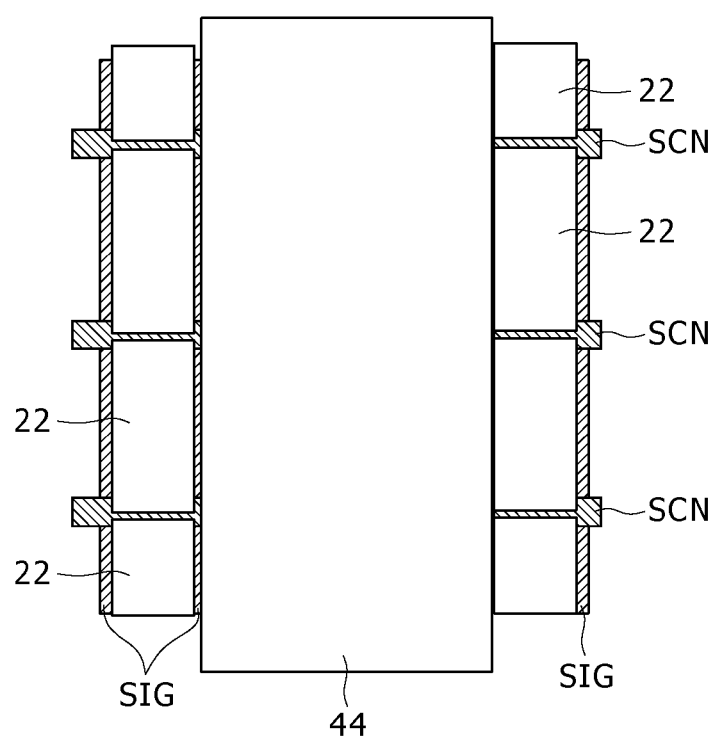
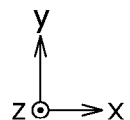

(LINE SHAPE IN Y-DIRECTION)

SEPARATED IN Y-DIRECTION

DISPLAY DEVICE AND METHOD OF MANUFACTURING SAME

RELATED APPLICATION DATA

This application is a continuation of U.S. patent application Ser. No. 12/706,808 filed Feb. 17, 2010, the entirety of which is incorporated herein by reference to the extent permitted by law. The present application claims the benefit of priority to Japanese Patent Application No. JP 2009-040728 filed on Feb. 24, 2009 in the Japan Patent Office, the entirety of which is incorporated by reference herein to the extent permitted by law.

BACKGROUND OF THE INVENTION

1. Field of the Invention

The present invention relates to a display device having a function of a capacitance type touch sensor (contact detecting device) enabling information input by contact of a finger of a user or the like, and a method of manufacturing the display device.

2. Description of the Related Art

The contact detecting device is generally a device detecting that a finger of a user, a pen or the like comes into contact with or proximity to a detecting surface.

A contact detecting device referred to as a so-called touch panel is known. The touch panel is formed so as to be superimposed on a display panel, and enables information input as a substitute for ordinary buttons by making various buttons displayed as an image on a display surface. Application of this technology to a small mobile device enables a display and a button arrangement to be shared, and provides great advantages of increasing the size of the screen or saving the space of an operating section and reducing the number of parts.

Thus, the "touch panel" generally refers to a panel-shaped contact detecting device combined with a display device.

However, providing a touch panel on a liquid crystal panel increases the thickness of the whole of the liquid crystal module. Accordingly, a liquid crystal display element provided with a capacitance type touch panel which element has a structure suitable for reduction in thickness has been proposed in Japanese Patent Laid-Open No. 2008-9750 (referred to as Patent Document 1 hereinafter), for example.

A capacitance type touch sensor has driving electrodes and a plurality of detecting electrodes forming a capacitance with each of the plurality of driving electrodes. The driving electrodes may be separated or not separated. When the driving electrodes are separated, the driving electrodes may be disposed in a separation direction orthogonal to the detecting electrodes. In this case, one of the driving electrodes and the detecting electrodes may be referred to as "X-(direction) electrodes," and the other of the driving electrodes and the detecting electrodes may be referred to as "Y-(direction) electrodes."

Japanese Patent Laid-Open No. 2008-129708 (referred to as Patent Document 2 hereinafter), for example, proposes a touch panel structure having non-conducting transparent electrodes between patterns so as to prevent transparent electrodes from being visually perceived when detecting electrodes are patterned.

When a device for non-visualization is provided by a touch panel alone as in Patent Document 2, the patterns of the transparent electrodes cannot be visually perceived to some degree. On the other hand, even when there is some difference in transmittance in each pixel on a liquid crystal side, the difference is a level that presents no problem, and thus a sufficient measure for non-visualization is taken.

SUMMARY OF THE INVENTION

However, when a touch panel in which a measure for non-visualization is taken is externally laminated to a liquid crystal display panel in which a measure for non-visualization is similarly taken, a transparent electrode pattern may become more noticeable than before the lamination.

This phenomenon is considered to be caused by interference between a subtle difference in transmittance between pixels and a repetitive pattern of transparent electrodes in a touch panel (contact detecting device) such that the interference is in cycles visible to the human eye such as interference fringes or the like when the touch panel (contact detecting device) is superimposed on a display device such as a liquid crystal display panel or the like.

A substrate where transparent electrodes are disposed to cancel the pattern of the transparent electrodes in the large cycles is needed, thus increasing the thickness of the display device and leading to an increase in the number of steps.

The present invention provides a display device that can achieve the non-visualization of a transparent electrode pattern even in a constitution where detecting electrodes and the like for providing a function of a touch sensor are formed integrally within a display panel.

The present invention provides a method of manufacturing a display device which method does not increase cost for the achievement.

A display device related to a first embodiment of the present invention has a substrate, a plurality of pixel electrodes, a display functional layer, a driving electrode, and a plurality of detecting electrodes.

The plurality of pixel electrodes are arranged in a form of a matrix in a plane parallel with the substrate.

The display functional layer exerts an image display function on a basis of an image signal supplied to the pixel electrodes.

The driving electrode is opposed to the plurality of pixel electrodes.

The plurality of detecting electrodes are arranged in a form of a plane opposed to the driving electrode, are separated and arranged at a pitch of a natural number multiple of an arrangement pitch of the pixel electrodes in one direction in the arrangement plane, and are each capacitively coupled with the driving electrode.

In the display device, desirably, floating electrodes are arranged between the detecting electrodes in an arrangement of the detecting electrodes, and an arrangement pitch of the detecting electrodes, an arrangement pitch of the floating electrodes, and an arrangement pitch of the detecting electrodes and the floating electrodes are a natural number multiple of the arrangement pitch of the pixel electrodes.

The arrangement pitch of the pixel electrodes is a pixel pitch. The magnitude of the pixel pitch is predetermined by dimensions of the display device, resolution of image display, a limitation imposed by micromachining techniques, and the like. On the other hand, the pitch of the plurality of detecting electrodes is determined from a viewpoint of object detection, which does not have a close relation to a display side. That is, the pitch of the plurality of detecting electrodes is determined from resolution of detection of size of an object to be detected, a necessary detection signal level, and the like. In general, when the arrangement pitch of detecting electrodes is too small such as the pixel pitch, parasitic capacitance between detecting lines is increased, and a change in capacitance when a finger, a conductive object or the like approaches is decreased. When the arrangement pitch of the detecting electrodes is too large, resolution of object detection falls.

In the above-described constitution, when an object such as a finger of a person, a conductive pen or the like comes into proximity to the plurality of detecting electrodes, the capacitance of a detecting electrode at that position is changed due to coupling of an external capacitance. The coupling of the external capacitance changes an induced voltage of the detecting electrode forming the capacitance. A detecting circuit connected to an end of the detecting electrode determines whether an object is present on the basis of the change.

In the present invention, first, floating electrodes are formed between pixel electrodes to adjust an electrode pitch to a pixel pitch in the whole of a layer of arrangement of detecting electrodes. At this time, the adjustment to the pixel pitch is attained in all intervals between the pixel electrodes, between the floating electrodes, and between the pixel electrodes and the floating electrodes. Specifically, the adjustment to the pixel pitch is achieved by making the pitches of the electrodes to be adjusted a natural number multiple of the pixel pitch.

Thus, in the display device as a whole, subtle difference in transmittance between pixels is not converted into difference in transmittance in large cycles such as interference fringes or the like.

In this case, because the adjustment to the pixel pitch is attained in all intervals between the pixel electrodes, between the floating electrodes, and between the pixel electrodes and the floating electrodes, transmittance in the display device as a whole is uniformized. When the transmittance is thus uniformized, variations in the pixel pitch to a certain degree do not affect non-visualization of the electrodes. When such variations are fluctuations less than the pixel pitch, for example, the variations do not affect the non-visualization.

A method of manufacturing a display device according to a second embodiment of the present invention includes the steps of: forming a plurality of pixel electrodes on a first substrate; forming a driving electrode on one of the first substrate and a second substrate; forming a plurality of detecting electrodes on one of the second substrate and another substrate; and filling a liquid crystal between the first substrate and the second substrate. The step of forming the plurality of detecting electrodes further includes a step of forming a transparent electrode layer and a step of dividing the transparent electrode layer. In the step of dividing the transparent electrode layer, the plurality of detecting electrodes arranged in a form of a plane opposed to the driving electrode and having a pattern separated in one direction in the plane of arrangement and a plurality of floating electrodes arranged between the detecting electrodes in an arrangement of the detecting electrodes are formed simultaneously. At this time, the transparent electrode layer is patterned such that the arrangement pitch of the detecting electrodes, the arrangement pitch of the floating electrodes, and the arrangement pitch of the detecting electrodes and the floating electrodes are a natural number multiple of the arrangement pitch of the pixel electrodes in the one direction.

According to the manufacturing method as described above, there is no increase in processes for the arrangement and formation of the floating electrodes.

According to the present embodiments, a display device achieving non-visualization of a transparent electrode pattern by the display device as a whole can be provided.

According to the present embodiments, a method of manufacturing a display device which method does not increase cost for non-visualization of a transparent electrode pattern by the display device as a whole can be provided.

BRIEF DESCRIPTION OF THE DRAWINGS

FIGS. 2A and 2B are a similar equivalent circuit diagram and a similar schematic sectional view when a finger is in contact with or in proximity to the touch sensor section shown in FIGS. 1A and 1B;

FIGS. 3A, 3B, and 3C are diagrams showing an input-output waveform of a touch sensor section according to an embodiment;

FIGS. 4A, 4B, 4C, and 4D are plan views and a schematic sectional view of an electrode pattern for touch detection of display devices according to the first to fourth embodiments and connection to a driving circuit for the electrode pattern;

FIGS. 8A and 8B are enlarged plan views of the liquid crystal display section after formation of detecting (driving) electrodes according to the first embodiment;

DETAILED DESCRIPTION OF THE PREFERRED EMBODIMENTS

Figure 1B:
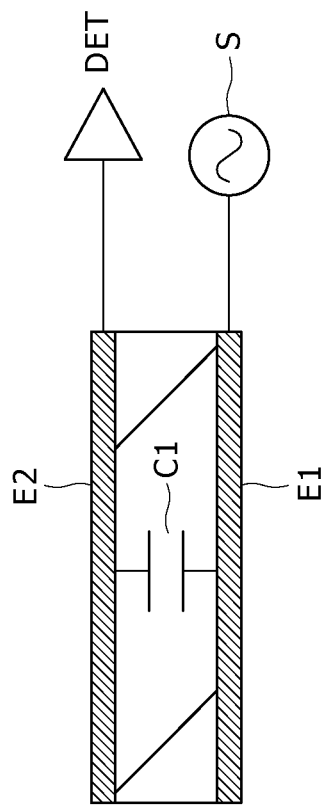
FIGS. 1A and 1B are an equivalent circuit diagram and a schematic sectional view of assistance in explaining operation of touch sensor sections according to a first to a fourth embodiment.

Preferred embodiments of the present invention will be described with reference to the drawings by taking as an example a case where a display device is a liquid crystal display device.

Description will hereinafter be made in the following order.
1. First Embodiment: Both Driving Electrode and Detecting Electrode Adjusted to Pixel Pitch
2. Second Embodiment: Improving Similarity to Detecting Electrode by Arrangement and Shape of Floating Electrode
3. Third Embodiment: Improving Similarity to Floating Electrode by Slit of Detecting Electrode
4. Example of Modification: Modification Relating Particularly to Sectional Structure In the following embodiments, a liquid crystal display device provided with a so-called touch sensor which device is formed by integrating the function of the touch sensor into a display panel will be taken as an example.

1. First Embodiment

An electrode that is provided farther into a panel than the detecting electrode (electrode to which a finger or the like is brought into proximity on the side of a display surface) of a touch sensor and which is another electrode for forming a capacitance between the electrode and the detecting electrode will be referred to as a driving electrode. While the driving electrode may be exclusively used for the touch sensor, the driving electrode in this case is an electrode serving a double purpose to perform scanning driving of the touch sensor and so-called VCOM driving of an image display device simultaneously, as a constitution desirable for reduction in thickness.

With this case as an example, the present embodiment will be described below with reference to drawings. Incidentally, simply referring to the driving electrode as a driving electrode is confusing as to which driving is indicated, and therefore the driving electrode will be referred to as a counter electrode in the following.

While sensor detection accuracy is proportional to the number of driving electrodes and detecting electrodes, providing sensor output lines separately from the detecting electrodes increases the number of pieces of wiring enormously. Thus, to make the detecting electrodes function also as sensor output lines, a driving method is desirable which subjects one of a plurality of driving electrodes to alternating-current driving and shifts the object of operation of the alternating-current driving within the arrangement of the plurality of driving electrodes arranged at a certain pitch and at predetermined intervals. A direction of shifting the object of operation as the driving electrode will hereinafter be referred to as a scanning direction. The scanning direction corresponds to "another direction" in the present invention, and a direction of separation and arrangement of a plurality of detecting electrodes corresponds to "one direction" in the present invention.

In a method of scanning the object of this alternating-current driving in the scanning direction (another direction), when changes in potential of the detecting electrodes are observed in such a manner as to follow the scanning, contact with or proximity to the surface of the touch panel by an object to be detected can be detected from a position at the time of scanning when a potential change occurred.

The application of the present invention is not limited to a driving method that divides driving electrodes in another direction, drives a predetermined number of driving electrodes at a time, and shifts the driving object. However, the driving method is desirable for reduction in thickness. Therefore, in the following embodiment, description will be made mainly supposing the driving method.

[Basic Constitution and Operation of Touch Detection]

First, the basics of touch detection in the display device according to the present embodiment will be described as an item common to four embodiments with reference to FIGS. 1A to 3C.

Figure 1A:
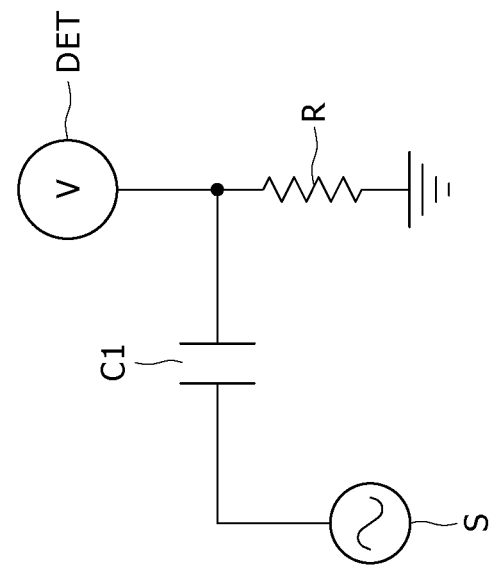

FIG. 1A and FIG. 2A are equivalent circuit diagrams of a touch sensor section. FIG. 1B and FIG. 2B are diagrams of structure (schematic sectional views) of the touch sensor section. FIGS. 1A and 1B represent a case where a finger as an object to be detected is not in proximity to a sensor. FIGS. 2A and 2B represent a case where the finger is in proximity to or in contact with the sensor.

The illustrated touch sensor section is a capacitance type touch sensor, and is composed of a capacitive element, as shown in FIG. 1B and FIG. 2B. Specifically, the capacitive element (capacitance) C1 is formed of a dielectric D and a pair of electrodes arranged so as to be opposed to each other with the dielectric D interposed between the electrodes, that is, a driving electrode E1 and a detecting electrode E2.

As shown in FIG. 1A and FIG. 2A, the driving electrode E1 of the capacitive element C1 is connected to an alternating-current signal source S that generates an AC pulse signal Sg. The detecting electrode E2 of the capacitive element C1 is connected to a voltage detector DET. At this time, the detecting electrode E2 is grounded via a resistance R, whereby a DC level is electrically fixed.

The AC pulse signal Sg of a predetermined frequency, for example a few [kHz] to a few ten [kHz] is applied from the alternating-current signal source S to the driving electrode E1. The waveform of the AC pulse signal Sg is illustrated in FIG. 3B.

Then, an output waveform (detection signal Vdet) shown in FIG. 3A appears in the detecting electrode E2.

Incidentally, as will be described later in detail, in embodiments of the present invention, the driving electrode E1 corresponds to a counter electrode for liquid crystal driving (electrode opposed to pixel electrodes and common to a plurality of pixels). In this case, for liquid crystal driving, the counter electrode is subjected to alternating-current driving referred to as so-called Vcom inversion driving. Thus, in embodiments of the present invention, a common driving signal Vcom for the Vcom inversion driving is used also as the AC pulse signal Sg for driving the driving electrode E1 for the touch sensor.

In a state shown in FIGS. 1A and 1B in which a finger is not in contact, the driving electrode E1 of the capacitive element C1 is subjected to alternating-current driving, and an alternating-current detection signal Vdet appears in the detecting electrode E2 as the driving electrode E1 is charged and discharged. The detection signal at this time will hereinafter be written as an "initial detection signal Vdet0." The detecting electrode E2 side is DC-grounded, but is not grounded in terms of high frequency. Therefore, there is no discharge path of alternating current, and the pulse peak value of the initial detection signal Vdet0 is relatively high. However, when a time passes after the rising of the AC pulse signal Sg, the pulse peak value of the initial detection signal Vdet0 gradually decreases due to a loss. FIG. 3C shows a waveform in an enlarged state together with a scale. The pulse peak value of the initial detection signal Vdet0 decreases by about 0.5 [V] from an initial value of 2.8 [V] with the passage of a short time due to a high-frequency loss.

When the finger comes into contact with the detecting electrode E2 or approaches the detecting electrode E2 to a close range so as to produce an effect from the initial state, as shown in FIG. 2A, a circuit state changes to a state equivalent to that of a capacitive element C2 being connected to the detecting electrode E2. This is because a human body is equivalent to a capacitance having one side grounded in terms of high frequency.

In this contact state, a discharge path of an alternating-current signal via the capacitive elements C1 and C2 is formed. Thus, as the capacitive elements C1 and C2 are charged and discharged, alternating currents I1 and I2 flow through the capacitive elements C1 and C2, respectively. Therefore the initial detection signal Vdet0 is voltage-divided into a value determined by a ratio between the capacitive elements C1 and C2 or the like, and the pulse peak value decreases.

A detection signal Vdet1 shown in FIG. 3A and FIG. 3C appears in the detecting electrode E2 when the finger comes into contact. FIG. 3C shows that an amount of decrease of the detection signal is about 0.5 [V] to 0.8 [V].

The voltage detector DET shown in FIGS. 1A and 1B and FIGS. 2A and 2B detects the contact of the finger by detecting the decrease in the detection signal using a threshold value Vth, for example.

[Constitution of Display Device]

Figure 5:
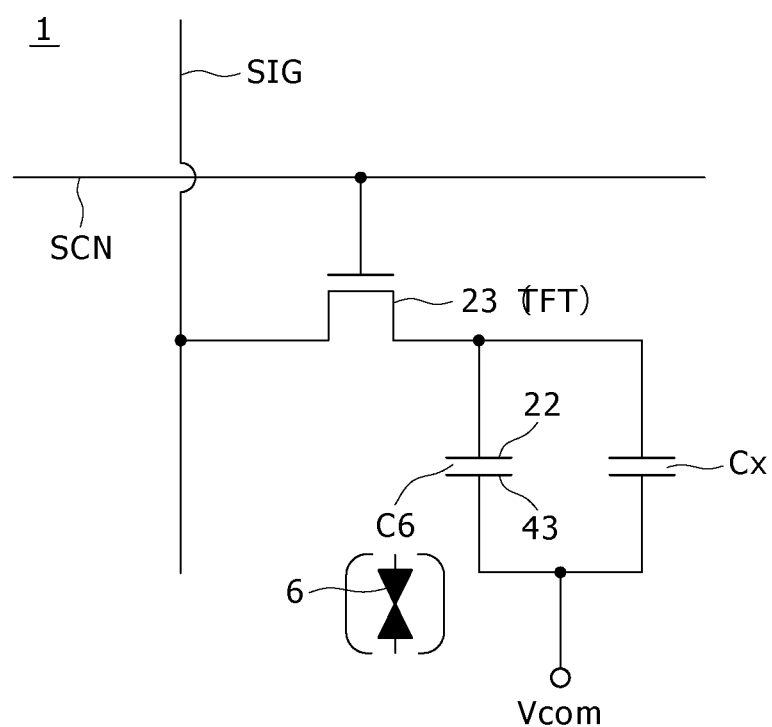
FIG. 5 is an equivalent circuit diagram of a pixel circuit of the display devices according to the first to fourth embodiments.

FIGS. 4A to 4C are plan views specialized in an arrangement of electrodes of the display device according to the present embodiment and circuits for driving the electrodes and for detection. FIG. 4D schematically shows a sectional structure of the display device according to the present embodiment. FIG. 4D shows a section of six pixels in a row direction (pixel display line direction), for example. FIG. 5 is a diagram of an equivalent circuit of a pixel.

The display device illustrated in FIGS. 4A to 4D is a liquid crystal display device having a liquid crystal layer as a "display functional layer."

As described above, the liquid crystal display device has an electrode (counter electrode) of two electrodes opposed to each other with the liquid crystal layer interposed between the electrodes, which electrode is common to a plurality of pixels and supplied with a common driving signal Vcom giving a reference voltage for a signal voltage for gradation display in each pixel. In embodiments of the present invention, this counter electrode is used also as an electrode for sensor driving.

In FIG. 4D, for easy viewing of the sectional structure, the counter electrode, a pixel electrode, and a detecting electrode, which form a main constitution of the present invention, are hatched, whereas hatching of other parts (substrates, insulating films, functional films and the like) is omitted. The omission of the hatching is similarly made in other subsequent diagrams of sectional structure.

The liquid crystal display device 1 has pixels PIX as shown in FIG. 5 which pixels are arranged in the form of a matrix.

As shown in FIG. 5, each pixel PIX has a thin film transistor (TFT) (hereinafter written as a TFT 23) as a selecting element of the pixel, an equivalent capacitance C6 of a liquid crystal layer 6, and a storage capacitor (referred to also as an additional capacitance) Cx. An electrode on one side of the equivalent capacitance C6 representing the liquid crystal layer 6 is a pixel electrode 22 separated for each pixel and arranged in the form of a matrix. An electrode on the other side of the equivalent capacitance C6 is a counter electrode 43 common to a plurality of pixels.

The pixel electrode 22 is connected to one of the source and the drain of the TFT 23. A signal line SIG is connected to the other of the source and the drain of the TFT 23. The signal line SIG is connected to a vertical driving circuit not shown in the figure. A video signal having a signal voltage is supplied from the vertical driving circuit to the signal line SIG.

The counter electrode 43 is supplied with a common driving signal Vcom. The common driving signal Vcom is generated by inverting a positive or negative potential with a central potential as a reference in each horizontal period (1 H).

The gate of the TFT 23 is electrically made common to all pixels PIX arranged in a row direction, that is, a horizontal direction of a display screen. Thereby a scanning line SCN is formed. The scanning line SCN is supplied with a gate pulse for opening and closing the gate of the TFT 23, which gate pulse is output from the vertical driving circuit not shown in the figure. Therefore the scanning line SCN is referred to also as a gate line.

As shown in FIG. 5, the storage capacitor Cx is connected in parallel with the equivalent capacitance C6. The storage capacitor Cx is provided to prevent a shortage of accumulating capacitance by the equivalent capacitance C6 and a decrease in writing potential due to a leakage current of the TFT 23 or the like. The addition of the storage capacitor Cx also contributes to the prevention of flicker and improvement in uniformity of screen luminance.

As viewed in a sectional structure (FIG. 4D), the liquid crystal display device 1 having such pixels arranged therein includes: a substrate (hereinafter referred to as a driving substrate 2) in which the TFT 23 shown in FIG. 5 is formed at a position not appearing in the section and which substrate is supplied with a driving signal (signal voltage) for the pixels; a counter substrate 4 disposed so as to be opposed to the driving substrate 2; and the liquid crystal layer 6 disposed between the driving substrate 2 and the counter substrate 4.

The driving substrate 2 has a TFT substrate 21 (a substrate body section is formed by glass or the like) as a circuit substrate in which the TFT 23 in FIG. 5 is formed and a plurality of pixel electrodes 22 arranged in the form of a matrix on the TFT substrate 21.

A display driver (the vertical driving circuit, a horizontal driving circuit and the like) not shown in the figure for driving each pixel electrode 22 is formed in the TFT substrate 21. In addition, the TFT 23 shown in FIG. 5 as well as wiring such as the signal line SIG, the scanning line SCN and the like is formed in the TFT substrate 21. A detecting circuit for performing touch detecting operation to be described later may be formed in the TFT substrate 21.

The counter substrate 4 has a glass substrate 41, a color filter 42 formed on one surface of the glass substrate 41, and the counter electrode 43 formed on the color filter 42 (liquid crystal layer 6 side). The color filter 42 is formed by periodically arranging color filter layers of three colors of red (R), green (G), and blue (B), for example, with each pixel PIX (pixel electrode 22) associated with one of the three colors R, G, and B. Incidentally, there are cases where a pixel associated with one color is referred to as a sub-pixel and sub-pixels of the three colors R, G, and B is referred to as a pixel. In this case, however, sub-pixels are also written as pixels PIX.

The counter electrode 43 serves also as a sensor driving electrode forming a part of a touch sensor performing touch detecting operation, and corresponds to the driving electrode E1 in FIGS. 1A and 1B and FIGS. 2A and 2B.

The counter electrode 43 is connected to the TFT substrate 21 by a contact conductive column 7. The common driving signal Vcom of an alternating-current pulse waveform is applied from the TFT substrate 21 to the counter electrode 43 via the contact conductive column 7. This common driving signal Vcom corresponds to the AC pulse signal Sg supplied from the driving signal source S in FIGS. 1A and 1B and FIGS. 2A and 2B.

A detecting electrode 44 is formed on the other surface (display surface side) of the glass substrate 41. Further, a protective layer 45 is formed on the detecting electrode 44. The detecting electrode 44 forms a part of the touch sensor, and corresponds to the detecting electrode E2 in FIGS. 1A and 1B and FIGS. 2A and 2B. A detecting circuit for performing touch detecting operation to be described later may be formed in the glass substrate 41.

The liquid crystal layer 6 modulates light passing through the liquid crystal layer 6 in a direction of thickness (direction in which the electrodes are opposed to each other) according to a state of an electric field applied to the liquid crystal layer 6 as a "display functional layer." As the liquid crystal layer 6, liquid crystal materials in various modes such as TN (Twisted Nematic), VA (Vertical Alignment), and ECB (Electrically Controlled Birefringence), for example, are used.

Incidentally, alignment films are respectively disposed between the liquid crystal layer 6 and the driving substrate 2 and between the liquid crystal layer 6 and the counter substrate 4. In addition, polarizers are respectively disposed on the non-display surface side (that is, the back side) of the driving substrate 2 and on the display surface side of the counter substrate 4. These optical functional layers are not shown in FIGS. 4A to 4D.

As shown in FIG. 4A, the counter electrode 43 is divided in a direction of rows or columns of the pixel arrangement, or a column direction (vertical direction of the figure) in the present example. The direction of this division corresponds to a direction of scanning of pixel lines in display driving, that is, a direction in which the vertical driving circuit not shown in the figure sequentially activates scanning lines SCN.

The counter electrode 43 is divided into n pieces in total. Thus, counter electrodes 43_1, 43_2, . . . , 43_m, . . . , 43_n are arranged in the form of a plane having a stripe-shaped pattern that is long in a row direction, and are spread all over in parallel with each other with a clearance from each other within the plane.

The divided arrangement pitch of the n divided counter electrodes 43_1 to 43_n is set at a natural number multiple of a pixel (sub-pixel) pitch or the arrangement pitch of the pixel electrodes.

Incidentally, a reference "EU" shown in FIGS. 4A and 4C has a set of m (>2) counter electrodes, and alternating-current driving is performed in this unit. This unit will be referred to as an alternating-current driven electrode unit EU. The alternating-current driving unit is larger than one pixel line for purposes of increasing the capacitance of the touch sensor and increasing the detecting sensitivity of the touch sensor. On the other hand, the alternating-current driven electrode unit EU is shifted by a natural number multiple of the pixel pitch unit, whereby the shift can be made invisible.

On the other hand, in the Vcom driving thus having the alternating-current driven electrode unit EU of counter electrodes as a unit, the shift operation of the Vcom driving is performed by a Vcom driving circuit 9 as an "alternating-current driving scanning section" provided within the vertical driving circuit (writing driving scanning section) not shown in the figure. The operation of the Vcom driving circuit 9 can be considered equal to an "operation of moving an alternating-current signal source S (see FIGS. 1A and 1B and FIGS. 2A and 2B) for performing simultaneous Vcom alternating-current driving of wiring of m counter electrodes in the column direction and scanning the selected counter electrodes in the column direction while changing the selected counter electrodes one by one."

The Vcom driving of electrode driving and non-visualization of the driving electrode by the Vcom driving are desirable, but are not essential in the present invention.

The present invention provides a constitution for non-visualization of a pattern due to the arrangement of transparent electrodes in the display device as a whole irrespective of whether shift driving is performed or not.

[Divided Arrangement Pitch of Counter Electrodes (Driving Electrodes)]

The divided arrangement pitch of detecting electrodes will first be described in more detail.

Figure 6:
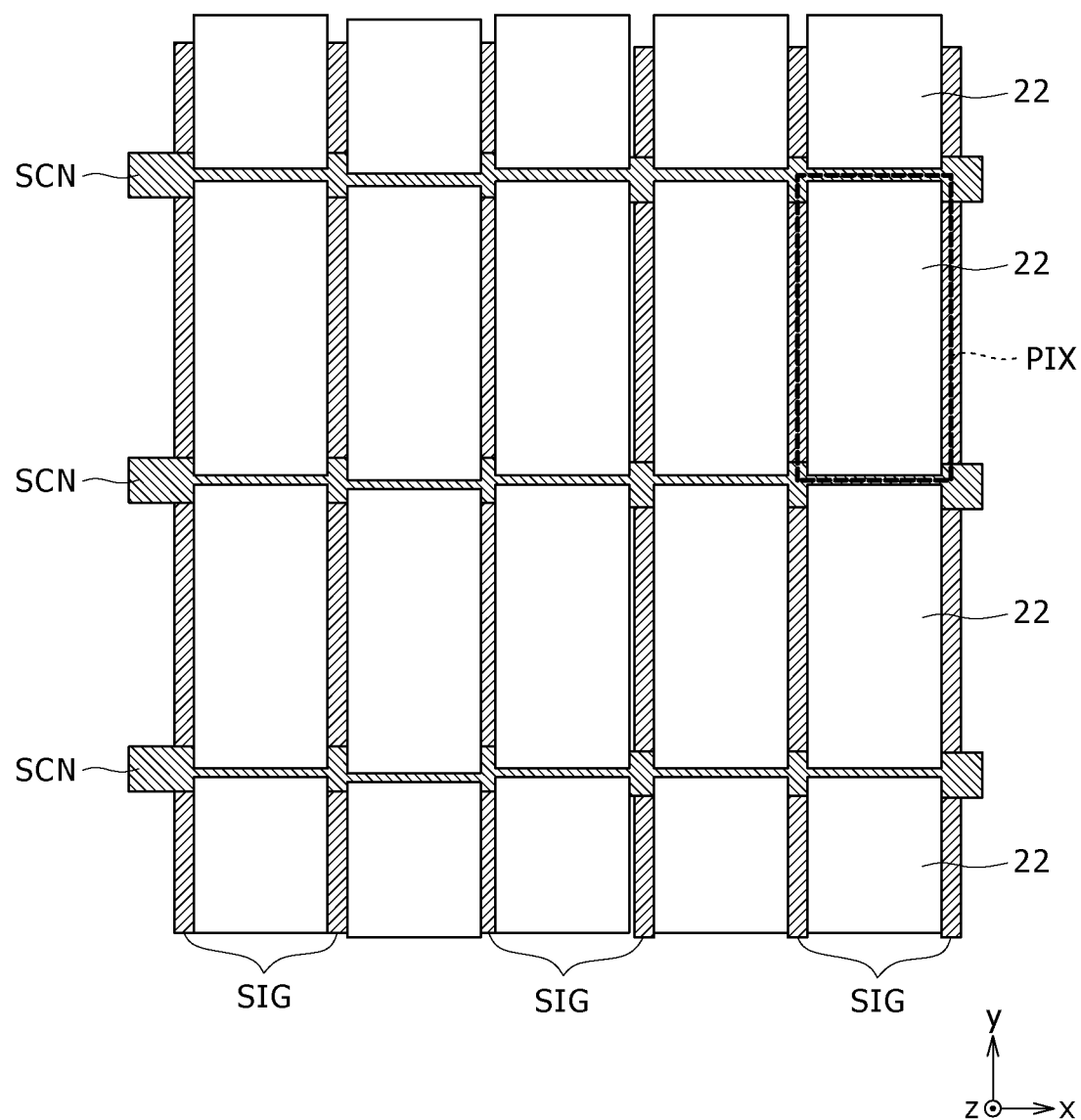
FIG. 6 is an enlarged plan view of a liquid crystal display section after formation of pixel electrodes according to the first embodiment.

FIG. 6 is an enlarged plan view of a display section in a process of being manufactured in which display section pixel electrodes 22 are formed.

In the plan view in a state where the pixel electrodes 22 illustrated in FIG. 6 are formed, a plurality of gate lines (scanning lines SCN: see FIG. 5) arranged in the form of parallel stripes in a row direction (x-direction) intersect a plurality of signal lines SIG arranged in the form of parallel stripes in a column direction (y-direction). A rectangular region enclosed by two arbitrary scanning lines SCN and two arbitrary signal lines SIG defines a pixel (sub-pixel) PIX. A pixel electrode 22 is formed in a rectangular isolated pattern slightly smaller than each pixel PIX. Thus, a plurality of pixel electrodes 22 are arranged in a plane in the form of a matrix.

Figure 7A:
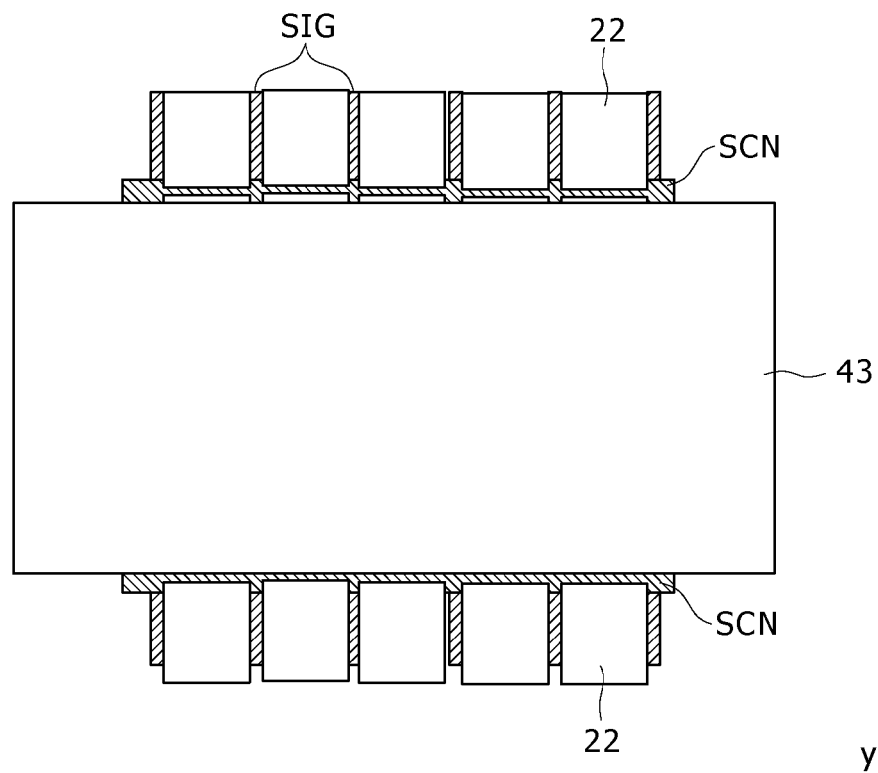
FIGS. 7A and 7B are enlarged plan views of the liquid crystal display section after formation of counter electrodes according to the first embodiment.
Figure 7B:
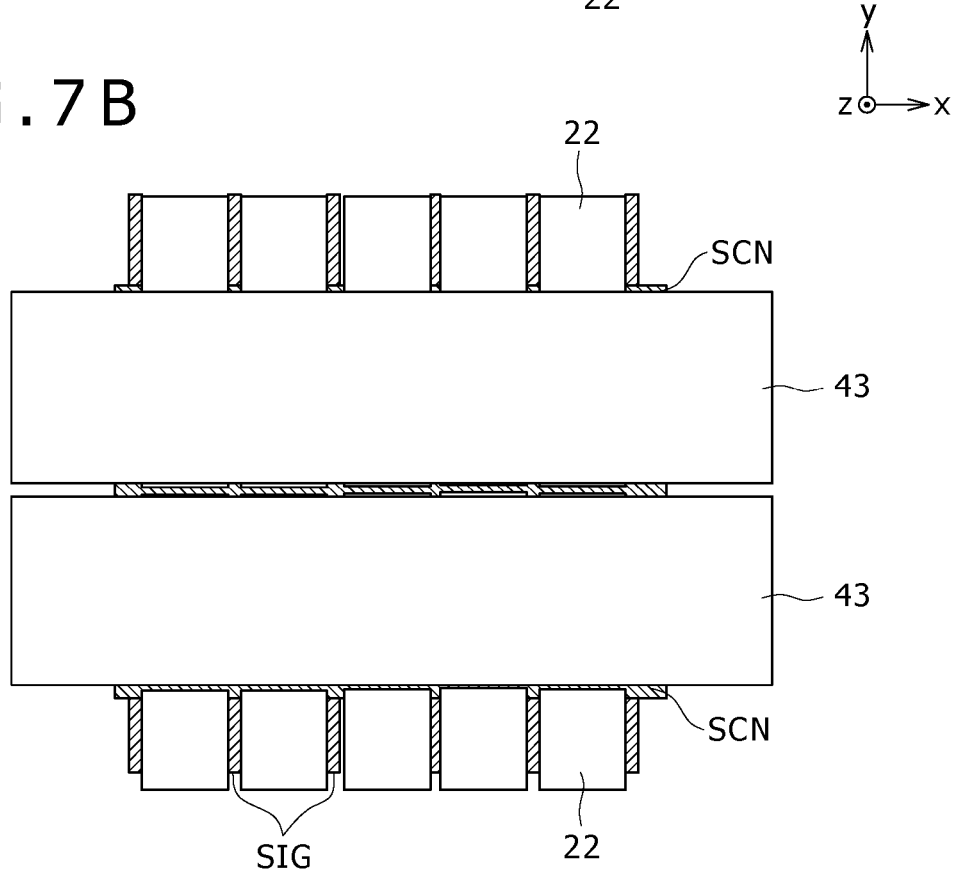

FIGS. 7A and 7B are enlarged plan views after counter electrodes (driving electrodes) 43 are formed above in the z-direction of FIG. 6.

As shown in FIGS. 7A and 7B, the counter electrodes 43 are formed as wiring that is long in the x-direction parallel with the scanning lines SCN.

In FIG. 7A, a counter electrode 43 is formed with a width of a two-pixel pitch. In FIG. 7B, counter electrodes 43 are formed with a width of a one-pixel pitch. The counter electrodes 43 may be separated and arranged at a pitch that is a natural number multiple of a pixel pitch, that is, three times the pixel pitch or more in the y-direction.

From the above, one of features of the present embodiment is that a plurality of counter electrodes 43 as "driving electrodes" are separated and arranged at a pitch that is a natural number multiple of the pixel pitch in another direction (y-direction in this case).

While an original counter electrode is common to all pixels, it suffices for the Vcom driving circuit 9 shown in FIGS. 4A to 4D to drive a part of counter electrodes which part is necessary for display. This provides an advantage of being able to decrease the driving power of each alternating-current signal source S forming the Vcom driving circuit 9 and miniaturize the driving circuit of the Vcom driving circuit 9 as a whole.

FIGS. 8A and 8B are enlarged plan views of the display section in the process of being manufactured in which display section detecting electrodes 44 are further arranged above in the z-direction of FIGS. 7A and 7B. Incidentally, in FIGS. 8A and 8B, for easy viewing of relation to pixels, the counter electrodes 43 arranged in FIGS. 7A and 7B are omitted intentionally.

The detecting electrodes 44 enable position detection with a higher resolution when wiring is performed for a shorter distance between the detecting electrodes 44. However, too short a distance is not desirable because a capacitance between an input device and a detecting electrode is reduced.

Though depending on the size of the input device and the size of the display pixels, the width in the x-direction of the detecting electrodes 44 is desirably about 10 to 2000 [μm] when a touch sensor is assumed as an input device. In the case of an object with a thin tip such as a conductive pen or the like, the width of the detecting electrodes 44 is desirably about 5 to 500 [μm].

The detecting electrodes 44 are arranged in synchronism with pixel size in a range of the above-described desirable width. Specifically, in the example of FIG. 8A, the arrangement pitch in the x-direction of the detecting electrodes 44 is set at three times the pixel pitch. In the example of FIG. 8B, the width in the x-direction of the detecting electrodes 44 is about three times the pixel pitch. The arrangement pitch of the detecting electrodes 44 in the x-direction in FIG. 8B can be a natural number multiple of the pixel pitch, that is, four times the pixel pitch or more.

The above being description of the synchronism between the arrangement pitch of the detecting electrodes 44 and the pixel pitch, the arrangement of the detecting electrodes 44 is more desirably synchronized with a color cycle.

For example, consideration will be given to a case where color regions of the color filter 42 of RGB are repeated in the x-direction in the examples of FIGS. 8A and 8B.

In this case, in the example of FIG. 8A, the arrangement pitch in the x-direction of the detecting electrodes 44 is set at a multiple of three times the pixel pitch, that is, a three-pixel pitch, a six-pixel pitch, . . . . In the example of FIG. 8B, the width in the x-direction of the detecting electrodes 44 is set at about a multiple of three times the pixel pitch, and the width of separation between the detecting electrodes 44 is also set at about a multiple of three times the pixel pitch.

Thus, in FIG. 8A, the detecting electrodes 44 are arranged so as to correspond to a specific color, for example green (G). In FIG. 8B, the detecting electrodes 44 cover a region of three colors of RGB.

By thus synchronizing with the pixel pitch and uniformizing color arrangement with respect to the detecting electrodes 44, manifestation of slight difference in transmittance due to color difference is prevented more.

As a result, the pixel electrodes 22, the counter electrodes 43, and the detecting electrodes 44 made of transparent electrode materials all correspond to the pixel pitch. In addition, a manner of superimposition between the counter electrodes 43 and the detecting electrodes 44 does not differ between pixels of a specific color.

Incidentally, the pixel electrodes 22, the counter electrodes 43, and the detecting electrodes 44 are preferably formed of transparent electrode materials. These electrodes may be formed of ITO and IZO as well as organic conductive films as transparent electrode materials.

2. Second Embodiment

When there is no layer of a transparent electrode material between detecting electrodes 44 as in the first embodiment, difference in transmittance can occur between colors. In the present embodiment, floating electrodes are arranged to match transmittance between the detecting electrodes 44 to the transmittance of the detecting electrodes 44 themselves.

FIGS. 9A and 9B and FIGS. 10A and 10B are enlarged plan views showing floating electrodes arranged between detecting electrodes 44.

As shown in FIGS. 9A and 9B and FIGS. 10A and 10B, floating electrodes 46A are arranged between detecting electrodes 44 to reduce difference in transmittance between colors.

Figure 9A:
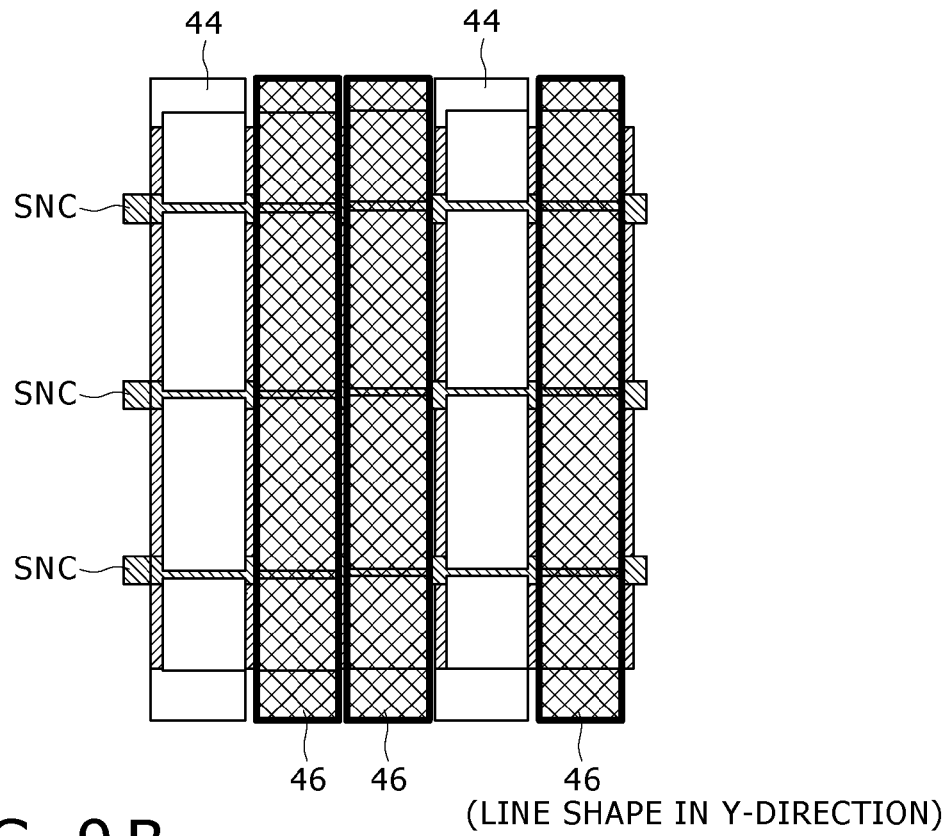
FIGS. 9A and 9B are enlarged plan views when a liquid crystal display section according to the second embodiment has floating electrodes.
Figure 9B:
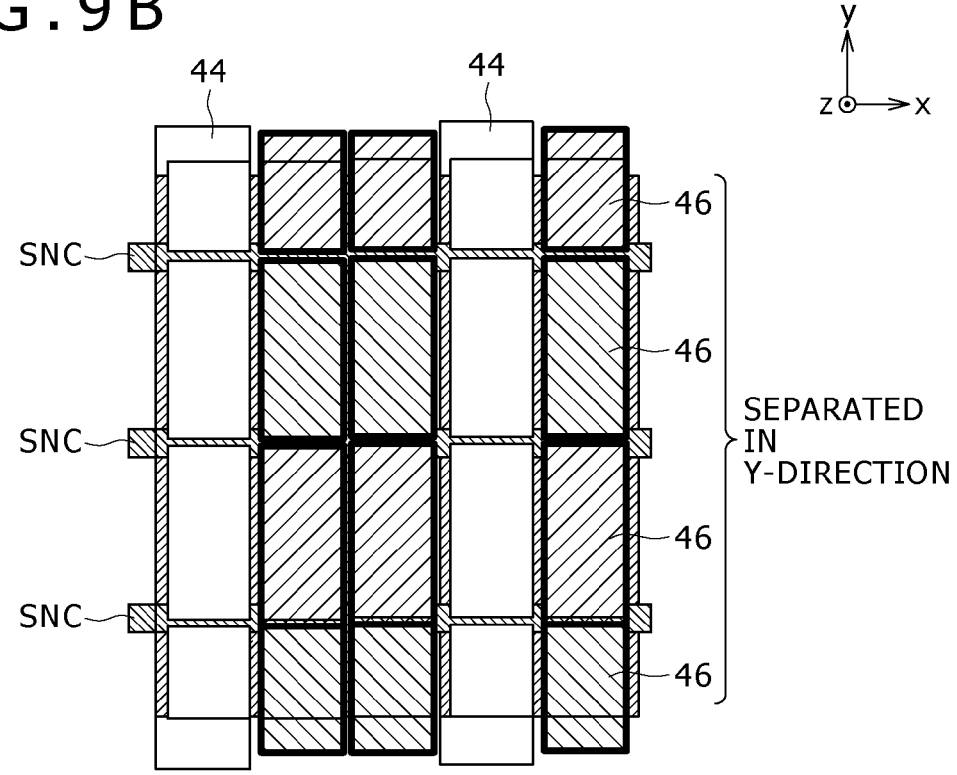

The floating electrodes 46A in the present embodiment may have a line shape similar to that of detecting electrodes 44, as shown in FIG. 9A. Alternatively, as shown in FIG. 9B, floating electrodes 46 may be arranged in the form of rectangular tiles divided in substantially the size of a pixel.

Thus, it suffices for the floating electrodes 46 to have an arrangement pitch corresponding to a natural number multiple of a pixel pitch in at least one of an x-direction (one direction) and a y-direction (another direction).

Considering pattern similarity to the detecting electrodes 44, it is desirable that the floating electrodes 46 have the same line shape in the y-direction as the detecting electrodes 44 (FIG. 9A).

On the other hand, because a large size of one floating electrode 46 causes a high stray capacitance, a voltage change in a counter electrode (driving electrode) 43 in a space between detecting electrodes 44 may not be transmitted easily as a capacitance change on an external capacitance side on the side of an object to be detected. As a result, the level of a detection signal may be decreased.

The pattern similarity between the detecting electrodes 44 and the floating electrodes 46 for this non-visualization and the magnitude of an optimum stray capacitance for increasing detecting sensitivity are considered to be in tradeoff relation.

Accordingly, as shown in other embodiments below, in the present invention, various forms of stray capacitance are tolerated to strike a balance between non-visualization and an increase in sensitivity from the viewpoint of the above-described tradeoff as long as the requirement of a natural number multiple of the pixel pitch in the x-direction and the y-direction is satisfied.

The patterns of FIGS. 8A and 8B described above (first embodiment) are visually perceived unless the cycle is 100 [μm] or less.

On the other hand, when floating electrodes 46 having substantially a natural number multiple of the size of a pixel electrode 22 are provided, the detecting electrodes and the floating electrodes 46 may not be distinguished from each other, and the pattern is not easily perceived even when the cycle is more than 100 [μm].

At this time, it is desirable to shorten distance between the detecting electrodes and the floating electrodes 46 as much as possible. Though depending on the size of display pixels, an aperture ratio and the like, this distance is desirably about 1 to 30 [μm], and is more desirably 1 to 15 [μm]. Further, as another index, it is desirable to cover 85% or more of an effective area with the detecting electrodes and the floating electrodes 46.

Figure 10A:
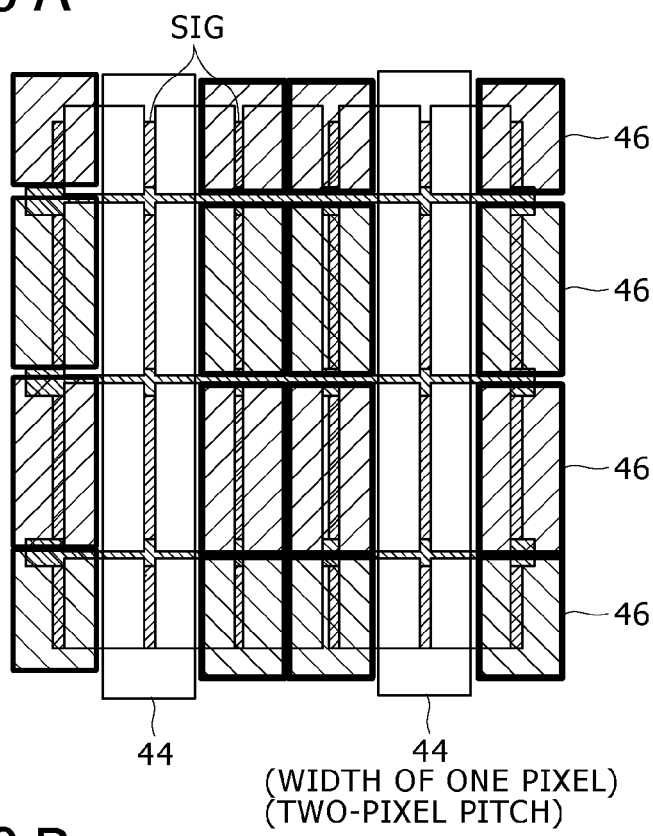
FIGS. 10A and 10B are enlarged plan views of floating electrodes and detecting electrodes in a different arrangement from FIGS. 9A and 9B.
Figure 10B:
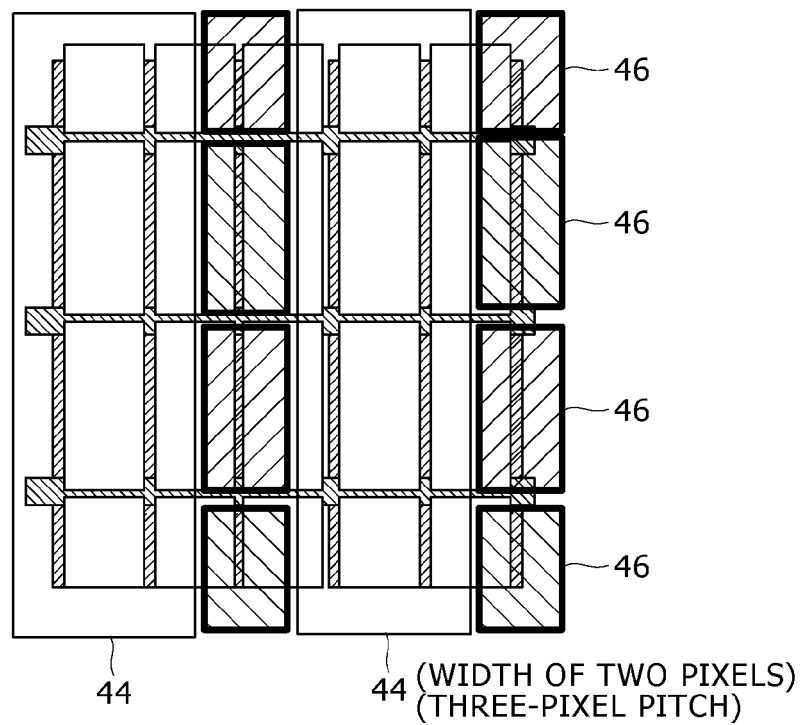

FIGS. 10A and 10B are different from FIGS. 9A and 9B in that the arrangement of the detecting electrodes 44 and the floating electrodes 46 is shifted by ½ of a pixel in the x-direction with respect to the arrangement of pixel electrodes 22. This does not cause a change in the arrangement pitch corresponding to a natural number multiple of the pixel pitch, and does not change the regularity of electrode arrangement. When signal lines SIG having low light transmittance are arranged in a region easily transmitting light between the detecting electrodes 44 and the floating electrodes 46, the efficiency of use of light is decreased. In addition, a difference between the transmittance of the part of the signal lines SIG and the transmittance of other parts is increased. Accordingly, it may be desirable to employ the arrangement shifted by ½ of a pixel from viewpoints of both improvements in the efficiency of use of light and the uniformity of transmittance.

In this case, the detecting electrodes 44 and the floating electrodes 46 are formed of a same transparent electrode material in a same step, that is, photolithography technology. The number of steps is not increased as compared with the cases of FIGS. 8A and 8B where the floating electrodes 46 are not present.

According to the first and second embodiments described above, both the counter electrodes 43 and the detecting electrodes 44 as transparent electrodes other than the pixel electrodes 22 have an arrangement pitch that is a natural number multiple of the pixel pitch in other than the line direction of a long dimension as signal lines, that is, in a width direction.

In addition, the electrode pitch in the width direction of the counter electrodes 43 and the detecting electrodes 44 is desirably defined such that both the counter electrodes 43 and the detecting electrodes 44 are superimposed in the same manner in a specific color.

In particular, in the second embodiment, the relation between the counter electrodes 43 and the detecting electrodes 44 is the same for each color, and the relation between the counter electrodes 43 and the floating electrodes 46 is the same for some colors. In addition, the floating electrodes 46 have such a shape and an arrangement as to resemble the detecting electrodes 44 as much as possible macroscopically.

According to the first and second embodiments, the relation between the counter electrodes (driving electrodes) 43 and the detecting electrodes 44 is thus a natural number multiple of the pixel pitch, and therefore the relation does not vary periodically. In addition, periodic variation is suppressed as much as possible in each color and between colors.

As a result, a subtle difference in transmittance between pixels (between colors in particular) is not easily perceived by the human eye. A minimum value of such a divided arrangement pitch is desirably such that the cycle in particular is 100 [µm] or less.

In either of the first and second embodiments, it is desirable that a separation region between electrodes be set on a same color of the color filter. For this, at least the arrangement pitch in the x-direction of the detecting electrodes 44 is defined as a natural number multiple of three times the pixel pitch. This requirement is satisfied in any of the cases of FIGS. 8A to 10B.

Thereby, a difference in decrease in transmittance in a same color can be eliminated.

Figure 11:
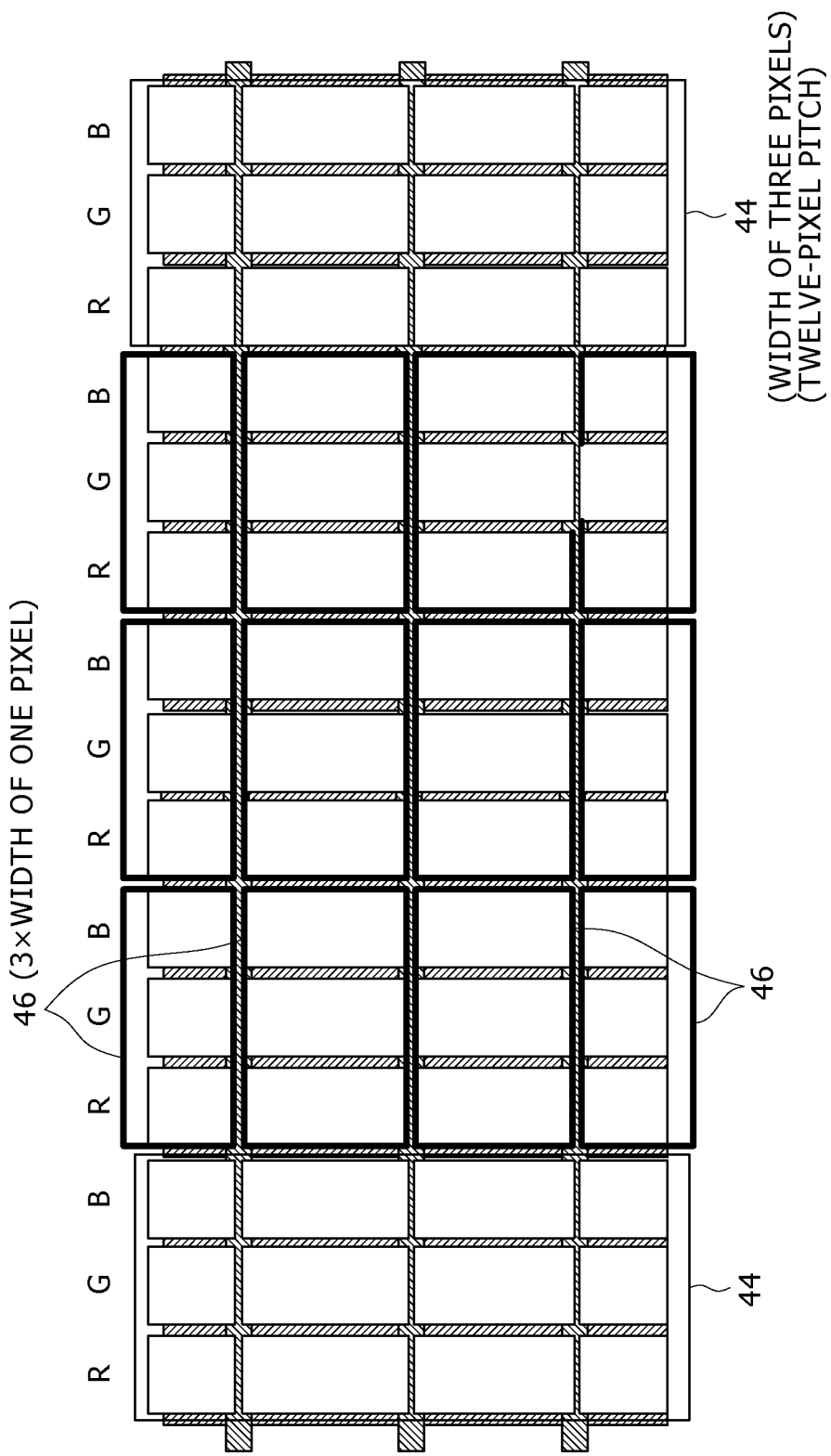
FIG. 11 is a plan view corresponding to FIGS. 9A and 9B with relation to a color arrangement added.
Figure 12:
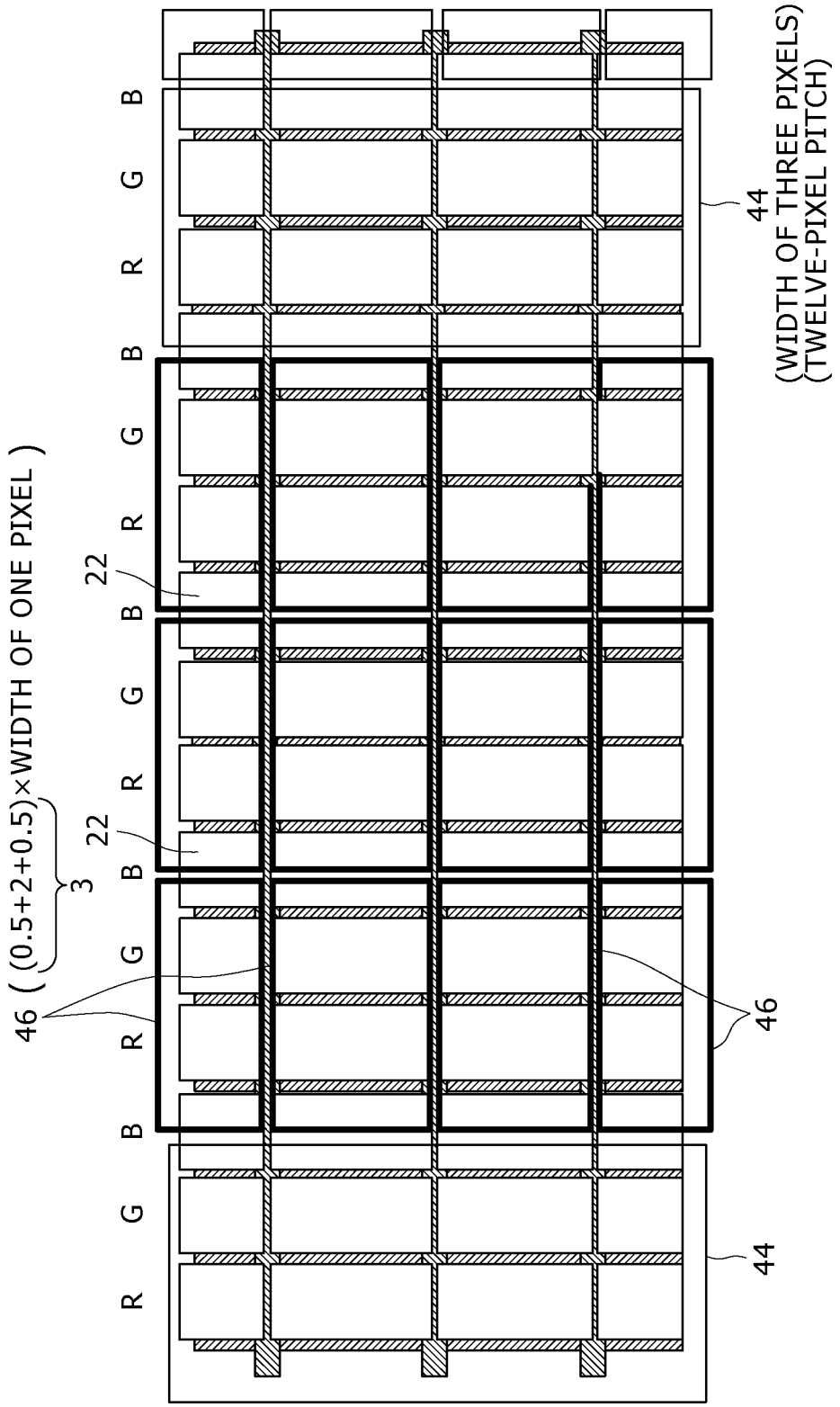
FIG. 12 is a plan view corresponding to FIGS. 10A and 10B with relation to the color arrangement added.

As examples for making this clearer, FIG. 11 and FIG. 12 represent cases where detecting electrodes 44 have a width in the x-direction of a three-pixel pitch and have an arrangement pitch of a 12-pixel pitch.

In FIG. 11, signal lines SIG are arranged in inter-electrode separation regions between floating electrodes 46 and inter-electrode separation regions between floating electrodes 46 and detecting electrodes 44. FIG. 11 is similar to FIGS. 9A and 9B in this respect.

On the other hand, in FIG. 12, as in FIGS. 10A and 10B, inter-electrode separation regions between floating electrodes 46 or between floating electrodes 46 and detecting electrodes 44 are arranged so as to pass through about the center in the x-direction of pixel electrodes 22 of a predetermined color, for example (B).

This provides a high efficiency of use of light, and makes periodic stripes less visible. For example, when disposition of an inter-electrode separation region on a specific color region and non-disposition of an inter-electrode separation region on regions of some same colors are repeated, a large difference in transmittance occurs in cycles in which inter-electrode separation regions are arranged. Because the human eye is sensitive to a difference in transmittance at 100 [µm] or more, periodic stripes long in the y-direction are visually perceived due to the extension of such a cycle. In order to prevent the occurrence of stripes, inter-electrode separation regions have to be arranged on all specific colors. Alternatively, a loss in transmittance can be reduced by superimposing the part of the occurrence of stripes on other wiring.

3. Third Embodiment

The first and second embodiments bring the transmittance of regions between detecting electrodes close to the transmittance of the detecting electrodes 44 by the arrangement of floating electrodes 46.

However, a case is assumed in which there is a limitation preventing enlargement of each of the floating electrodes 46 in order to maintain detecting sensitivity, as described above.

In such a case, it is possible to make the pattern of detecting electrodes 44 resemble the arrangement pattern of floating electrodes 46.

Figure 13:
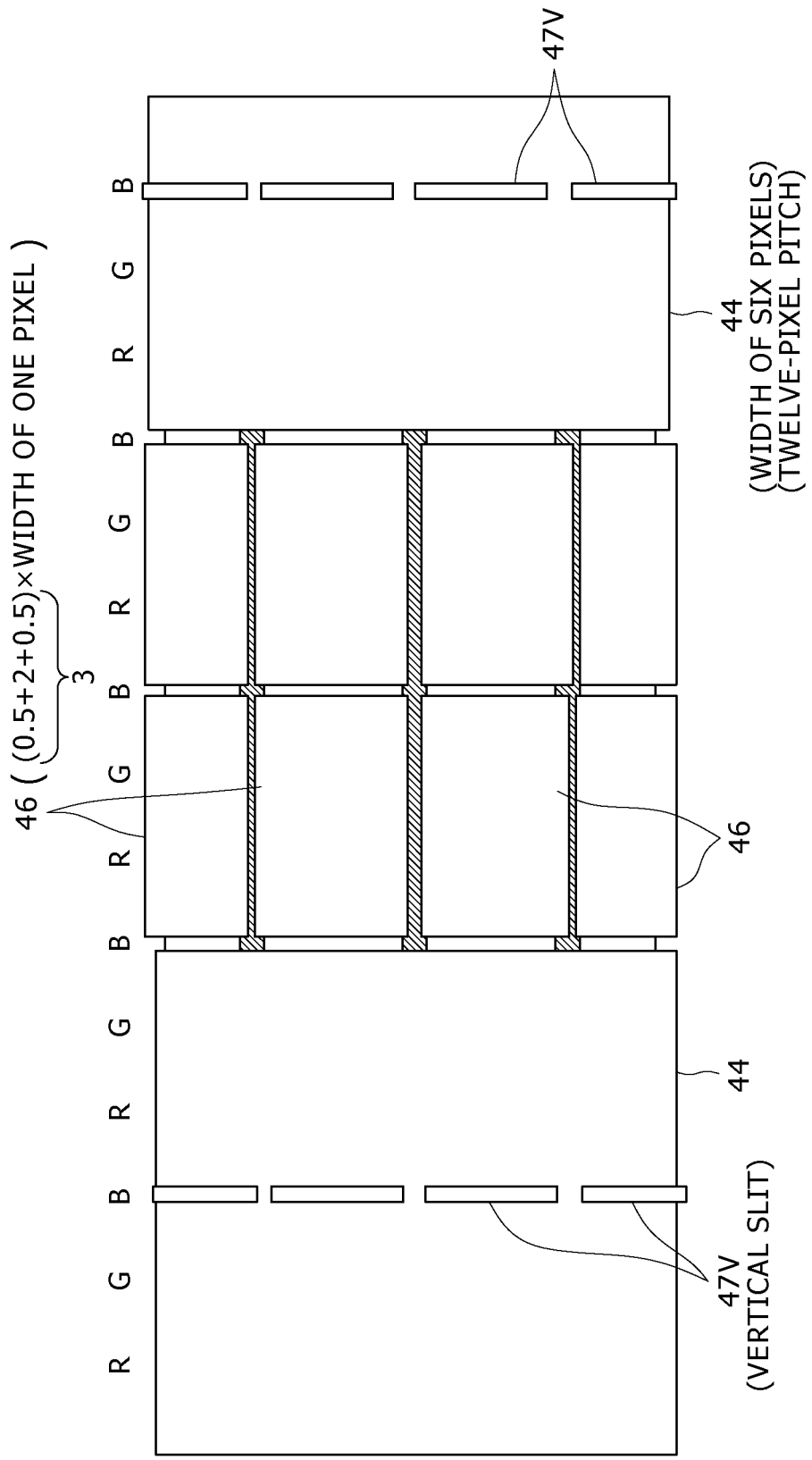
FIG. 13 is a plan view of detecting electrodes provided with vertical slits according to the third embodiment.
Figure 14:
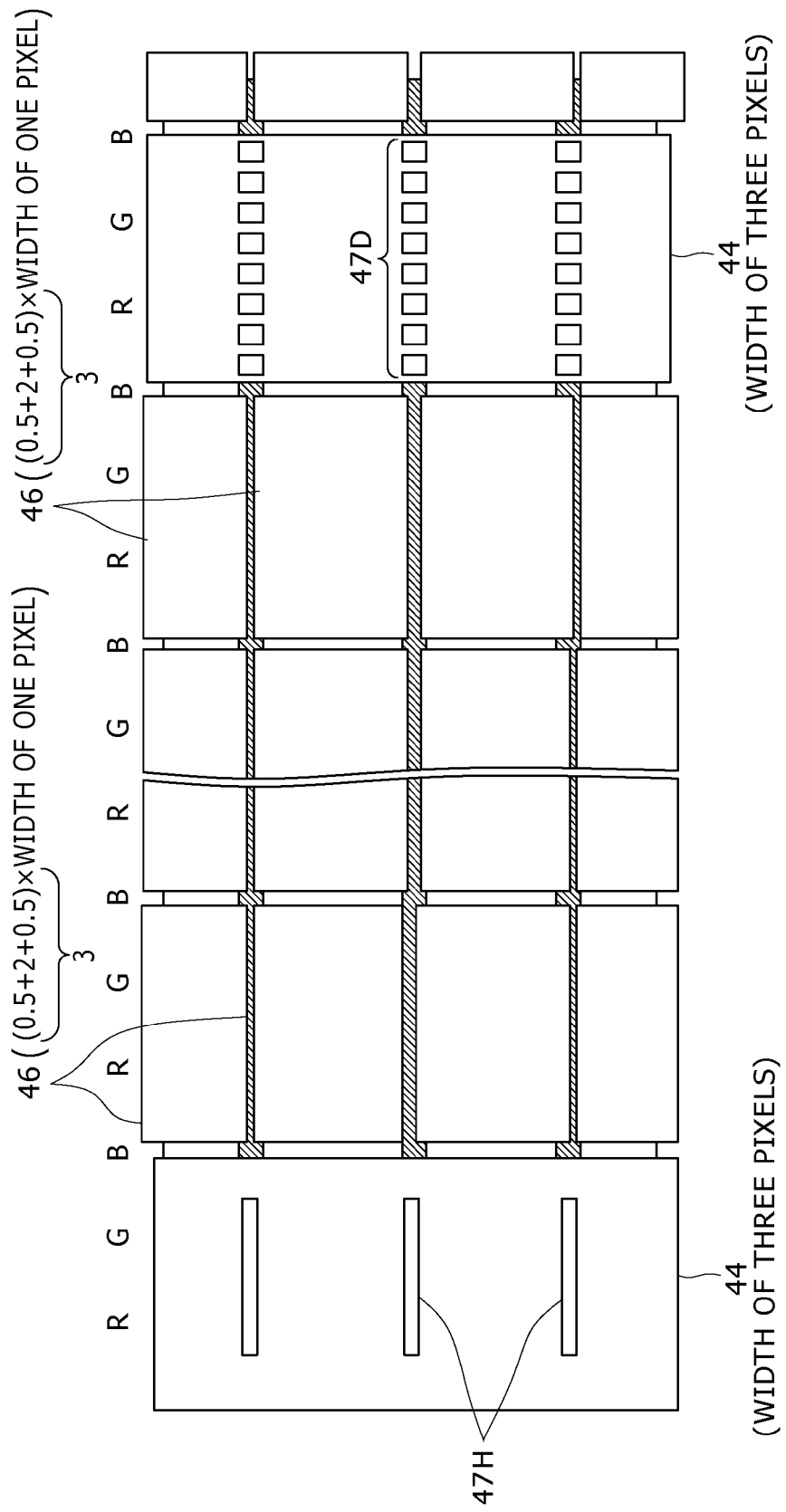
FIGS. 14A and 14B are plan views of detecting electrodes provided with horizontal (or dot-shaped) slits according to the third embodiment.

FIG. 13 and FIGS. 14A and 14B show an example of the pattern of detecting electrodes 44 determined for that purpose. Incidentally, in FIG. 13 and FIGS. 14A and 14B, the detecting electrodes 44 and floating electrodes 46 are not made transparent because making the detecting electrodes 44 transparent renders the figures less easy to view. However, the detecting electrodes 44 and the floating electrodes 46 are formed of a transparent electrode material as in other cases. A constitution on a lower layer side thereby hidden is the same as in FIG. 12.

In FIG. 13, the detecting electrodes 44 have a width of a pitch of six pixels, and are arranged at a pitch of 12 pixels. Short line-shaped slits 47V in a y-direction passing through the center of the detecting electrodes 44 in an x-direction are provided. Thereby, making the detecting electrodes 44 integral and set at a same potential and increasing pattern similarity to the floating electrodes 46 are compatible with each other. "Pseudo inter-electrode separation regions" are formed by aligning a plurality of slits 47 in the y-direction (another direction).

In this case, the pseudo inter-electrode separation regions including the slits 47V and inter-electrode separation regions not including slits are arranged so as to be superimposed on color regions of a same color (B-regions in the present example). This constitution is not essential, but is desirable to ensure the perfection of non-visualization in a sense that synchronization with color can be achieved.

This effect can be achieved by slits in the x-direction as in FIG. 14A and FIG. 14B. In this case, detecting electrodes 44 have a width of three pixels in relation to color arrangement.

In FIG. 14A, x-direction slits 47H long in the x-direction (width direction) are formed in a detecting electrode 44.

In FIG. 14B, x-direction slits are separated into the form of dots. Slit formation by dot arrangement is also desirable in order to achieve both of suppressing a decrease in resistance value as much as possible because slits in a direction of crossing the width direction of wiring limit a current path and making the slits as a whole resemble the separation of floating electrodes 46.

4. Examples of Modification

In the foregoing first to third embodiments, a case is taken as an example in which case a plurality of driving electrodes are arranged so as to be separated from each other in another direction orthogonal to one direction in which a plurality of detecting electrodes are arranged so as to be separated from each other. Also, in this example, a plurality of driving electrodes are arranged so as to be separated from each other, and the arrangement pitch of the plurality of driving electrodes is a natural number multiple of the arrangement pitch of pixel electrodes. Thus, in the first to fourth embodiments, driving of the driving electrodes of the touch sensor and the display functional layer (common voltage of the display functional layer) for liquid crystal display or the like is performed by the same driving electrodes. This structure and the driving method are desirable because of an advantage of being able to reduce the thickness of the (liquid crystal) display device integrated with the touch panel.

However, even when the touch panel is integrated with the display panel, the driving electrodes of the touch sensor may be provided as another layer than the driving (common) electrode for (liquid crystal) display. In this case, the driving electrodes of the touch sensor may be disposed as one electrode opposed to a plurality of pixel electrodes without being separated. However, relative positional relation between a plurality of detecting electrodes and the driving electrode is determined such that a capacitance is formed between each of the plurality of detecting electrodes and the driving electrode (of the touch sensor).

A liquid crystal layer 6 modulates light passing through the liquid crystal layer 6 according to the state of an electric field. A liquid crystal in a transverse electric field mode such for example as an FFS (Fringe Field Switching) mode or an IPS (In-Plane Switching) mode is suitably used as the liquid crystal layer 6.

Figure 15:
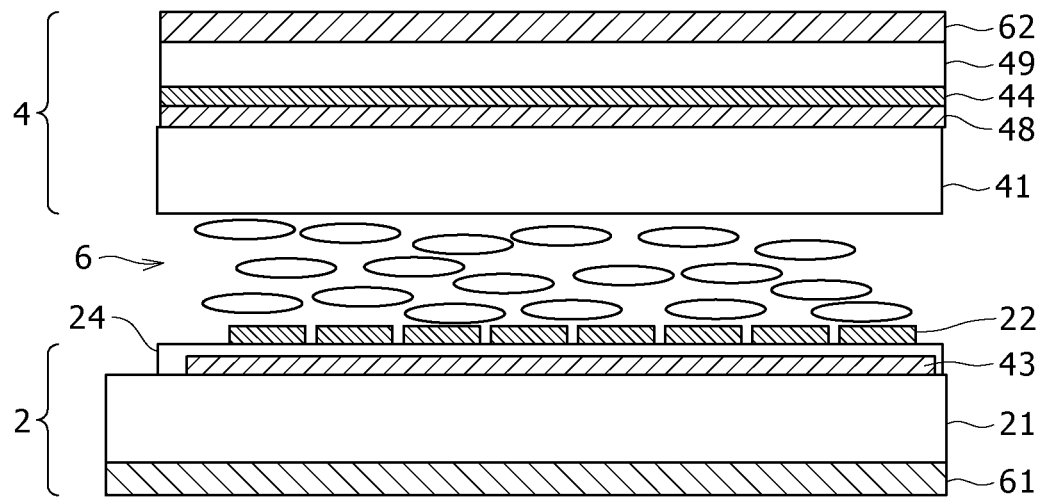
FIG. 15 is a schematic sectional structure diagram showing an example of constitution of an example of modification.
Figure 16:
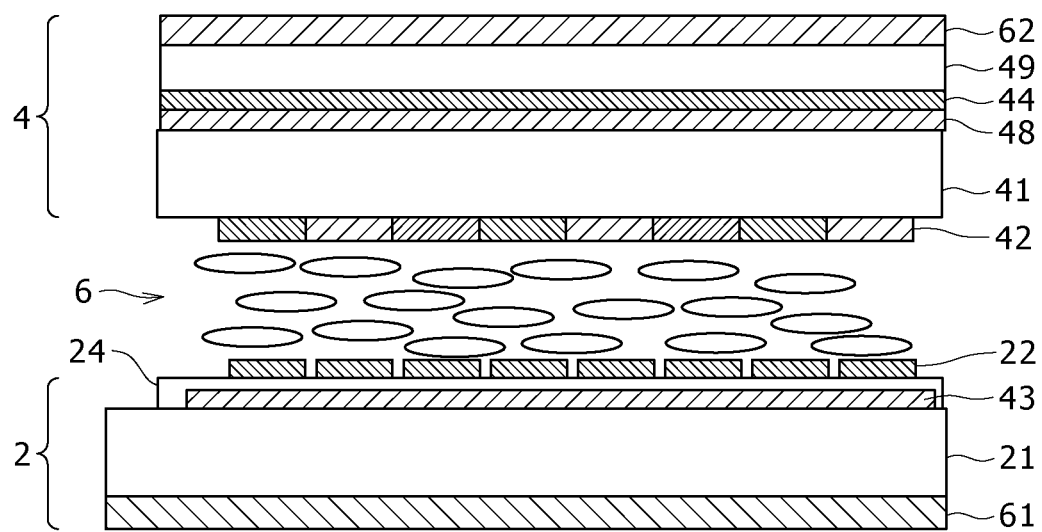
FIG. 16 is a schematic sectional structure diagram showing another example of constitution of the example of modification.
Figure 17:
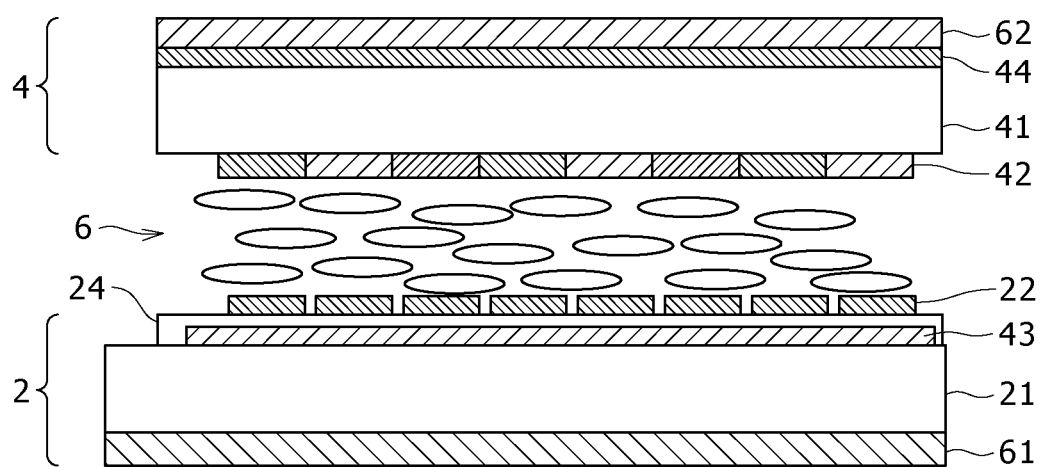
FIG. 17 is a schematic sectional structure diagram showing another example of constitution of the example of modification.

FIGS. 15 to 17 show an example of structure of a transverse electric field mode liquid crystal display device.

In the structure of FIGS. 4A to 4D, a pixel electrode 22 and a counter electrode 43 face each other with the liquid crystal layer 6 interposed between the pixel electrode 22 and the counter electrode 43, and an electric field in a vertical direction is applied to the liquid crystal layer 6 according to a voltage applied between the two electrodes.

In the transverse electric field mode, the pixel electrode 22 and the driving electrode (counter electrode) 43 are disposed on the side of a driving substrate 2.

In the structure of FIG. 15, the counter electrode 43 is disposed on a surface on a front side (display surface side) of a TFT substrate 21, and the counter electrode 43 and a pixel electrode 22 are in proximity to each other with an insulating layer 24 interposed between the counter electrode 43 and the pixel electrode 22. The counter electrode 43 is disposed in the form of a line long in the direction of display lines (x-direction). The pixel electrode 22 is separated in each pixel in that direction.

The TFT substrate 21 has the side of the pixel electrode 22 which side is adjacent to the liquid crystal layer 6, and is laminated to a glass substrate 41. The liquid crystal layer 6 is retained in terms of strength by a spacer not shown in FIG. 15.

A reference numeral "49" denotes a base material on the display surface side such as glass, transparent film or the like. A detecting electrode 44 is formed on one surface of the base material 49. The detecting electrode 44 retained by the base material 49 is fixed to the surface on the anti-liquid crystal side of the glass substrate 41 via an adhesive layer 48.

A first polarizer 61 is laminated to the back surface of the TFT substrate 21. A second polarizer 62 having a different direction of polarization from that of the first polarizer 61 is laminated to the display surface side of the base material 49.

A protective layer not shown in FIG. 15 is formed on the display surface side of the second polarizer 62.

In the structure shown in FIG. 16, a color filter 42 is formed on the liquid crystal side of the glass substrate 41 in advance. The color filter 42 has different color regions regularly arranged for each pixel (sub-pixel).

In the structure shown in FIG. 17, a laminated structure on a display surface side differs from FIG. 16.

In the structure shown in FIG. 16, a detecting electrode 44 is formed on a base material 49 in advance, and laminated as a roll-shaped member, for example. In FIG. 17, on the other hand, a detecting electrode 44 is formed on the display surface side of a glass substrate 41, and a second polarizer 62 is laminated onto the detecting electrode 44.

Incidentally, by properly selecting the index of refraction of an adhesive layer 48 in the structures of FIG. 15 and FIG. 16 having the adhesive layer 48, further non-visualization of an electrode pattern can be achieved.

The present invention is applicable to liquid crystal display devices of structures other than those of FIGS. 15 to 17 as well as other display devices using a transparent electrode. In addition, liquid crystal display devices may be any of a transmissive type, a reflective type, and a transreflective type. The second polarizer 62 is not limited to a linear polarizer or a circular polarizer.

As described above, according to embodiments and examples of modification of the present invention, a display device achieving non-visualization of a transparent electrode pattern in the display device as a whole can be provided.

In addition, when a floating electrode 46 is provided, there is no increase in the number of steps for non-visualization because a same electrode material as a detecting electrode 44 is patterned in a same step. In addition, the provision of the floating electrode 46 does not increase the thickness of the liquid crystal display device 1. As is clear from the foregoing embodiments, the floating electrode 46 is not essential, and non-visualization can be achieved by separating a counter electrode 43 and a detecting electrode 44 at an arrangement pitch that is a natural number multiple of a pixel pitch. When a floating electrode 46 is used, non-visualization at a higher level can be achieved without an increase in cost.

The present application contains subject matter related to that disclosed in Japanese Priority Patent Application JP 2009-040728 filed in the Japan Patent Office on Feb. 24, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display device comprising:
a display layer including a plurality of pixels; and
a touch panel including (a) plurality of stripe-shaped first electrodes extending in a first direction, (b) a plurality of stripe-shaped second electrodes crossing the plurality of stripe-shaped first electrodes and extending in a second direction that crosses the first direction, (c) a plurality of floating electrodes arranged between the second electrodes, (d) a plurality of first slits extending in the first direction between the floating electrodes, and (e) a plurality of second slits extending in the second direction between the floating electrodes, each of the plurality of second slits being in communication with the plurality of first slits.

2. The display device according to claim 1, further comprising:
   a driving circuit coupled to the plurality of stripe-shaped first electrodes; and
   a detection circuit coupled to the plurality of stripe-shaped second electrodes.

3. The display device according to claim 2, wherein when an alternating current drive signal is applied to the plurality of stripe-shaped first electrodes by the driving circuit, a detection signal is output to the detection circuit from the plurality of stripe-shaped second electrodes.

4. A capacitive touch panel comprising:
   (a) plurality of stripe-shaped first electrodes extending in a first direction;
   (b) a plurality of stripe-shaped second electrodes crossing the plurality of stripe-shaped first electrodes and extending in a second direction that crosses the first direction;
   (c) a plurality of floating electrodes arranged between the second electrodes;
   (d) a plurality of first slits extending in the first direction between the floating electrodes; and
   (e) a plurality of second slits extending in the second direction between the floating electrodes, each of the plurality of second slits being in communication with the plurality of first slits.

5. The capacitive touch panel according to claim 4, further comprising:
   a driving circuit coupled to the plurality of stripe-shaped first electrodes;
   a detection circuit coupled to the plurality of stripe-shaped second electrodes.

6. The capacitive touch panel according to claim 5, wherein, when an alternating current drive signal is applied to the plurality of stripe-shaped first electrodes by the driving circuit, a detection signal is output to the detection circuit from the plurality of stripe-shaped second electrodes on the basis of capacitance at each crossing area between the plurality of stripe-shaped first electrodes and the plurality of stripe-shaped second electrodes.

* * * * *